United States Patent
Valstar et al.

(10) Patent No.: US 12,154,313 B2
(45) Date of Patent: Nov. 26, 2024

(54) GENERATIVE NEURAL NETWORK FOR SYNTHESIS OF FACES AND BEHAVIORS

(71) Applicant: BlueSkeye AI Ltd, Nottingham (GB)

(72) Inventors: Michel Valstar, Nottingham (GB); Anthony Brown, Nottingham (GB); Timur Almaev, Nottingham (GB)

(73) Assignee: Blueskeye AI Ltd, Nottingham (GB)

( * ) Notice: Subject to any disclaimer, the term of this patent is extended or adjusted under 35 U.S.C. 154(b) by 522 days.

(21) Appl. No.: 17/596,996

(22) PCT Filed: Jun. 24, 2020

(86) PCT No.: PCT/GB2020/051521
§ 371 (c)(1),
(2) Date: Dec. 22, 2021

(87) PCT Pub. No.: WO2020/260869
PCT Pub. Date: Dec. 30, 2020

(65) Prior Publication Data
US 2022/0253676 A1 Aug. 11, 2022

(30) Foreign Application Priority Data
Jun. 24, 2019 (GB) .................................. 1909003

(51) Int. Cl.
*G06V 10/74* (2022.01)
*G06V 10/82* (2022.01)
(Continued)

(52) U.S. Cl.
CPC ............ *G06V 10/761* (2022.01); *G06V 10/82* (2022.01); *G06V 40/172* (2022.01); *G06V 40/20* (2022.01); *G10L 25/30* (2013.01); *G10L 25/78* (2013.01)

(58) Field of Classification Search
CPC .... G06V 10/761; G06V 40/172; G06V 10/82; G06V 40/20; G10L 25/30; G10L 25/78
See application file for complete search history.

(56) References Cited

U.S. PATENT DOCUMENTS 10,552,977 B1 * 2/2020 Theis ........................ G06T 7/70
10,565,894 B1 * 2/2020 Jain .......................... G16H 50/20
(Continued)

FOREIGN PATENT DOCUMENTS

| CN | 109171773 | | 1/2019 |
| EP | 3451209 | A1 | 3/2019 |

(Continued)

OTHER PUBLICATIONS

ISR for PCT/GB2023/052112 (Nov. 15, 2023), 26 pages.
(Continued)

*Primary Examiner* — Kevin Ky
(74) *Attorney, Agent, or Firm* — Koffsky Schwalb LLC; Mark I. Koffsky

(57) ABSTRACT

A computing system comprising a generative neural network (100) is disclosed. The generative neural network (100) is configured to receive a plurality of input videos. Each input video comprises a face defining an identity. Each input video comprises a behaviour. Each input video comprises the same behaviour as each of the other input videos, and a different identity to each of the other input videos. The generative neural network (100) is also configured synthesize an output video from the input videos. The output video comprises a synthetic face defining a synthetic identity. The generative neural network has been trained, with a loss function, to preserve the behaviour of the input videos while generating the synthetic identity that is different from each identity of the input videos.

27 Claims, 3 Drawing Sheets

(51) Int. Cl.
| | |
|---|---|
| G06V 40/16 | (2022.01) |
| G06V 40/20 | (2022.01) |
| G10L 25/30 | (2013.01) |
| G10L 25/78 | (2013.01) |

(56) References Cited

U.S. PATENT DOCUMENTS

| | | | |
|---|---|---|---|
| 10,594,757 B1* | 3/2020 | Shevchenko | G06F 17/18 |
| 10,960,838 B2 | 3/2021 | Sobhany | |
| 11,430,467 B1 | 8/2022 | Vasudevan | |
| 11,461,952 B1 | 10/2022 | Bosnak | |
| 11,632,456 B1 | 4/2023 | Mevorah | |
| 11,869,535 B1 | 1/2024 | Bahadori | |
| 2007/0237419 A1* | 10/2007 | Shechtman | G06V 40/20 382/278 |
| 2008/0175482 A1* | 7/2008 | Ma | G06F 18/2413 348/E5.062 |
| 2010/0042401 A1 | 2/2010 | Ascoli | |
| 2015/0313530 A1 | 11/2015 | Kodra | |
| 2017/0238859 A1 | 8/2017 | Sadowsky | |
| 2017/0365277 A1 | 12/2017 | Park | |
| 2018/0144761 A1 | 5/2018 | Amini | |
| 2018/0357286 A1 | 12/2018 | Wang | |
| 2018/0373979 A1* | 12/2018 | Wang | G06F 18/24143 |
| 2019/0172293 A1* | 6/2019 | Carey | G08B 13/19608 |
| 2019/0347526 A1* | 11/2019 | Sunkavalli | G06N 3/084 |
| 2019/0354879 A1* | 11/2019 | van Rensburg | G06N 20/20 |
| 2019/0385711 A1 | 12/2019 | Shriberg | |
| 2020/0090542 A1* | 3/2020 | Clevenger | G09B 5/065 |
| 2020/0104616 A1 | 4/2020 | El Kaliouby | |
| 2020/0202887 A1 | 6/2020 | Modi | |
| 2020/0265294 A1* | 8/2020 | Kim | G06T 13/40 |
| 2020/0302667 A1* | 9/2020 | del Val Santos | G06N 3/044 |
| 2020/0302952 A1 | 9/2020 | Pinkus | |
| 2021/0201078 A1* | 7/2021 | Yao | G06N 3/08 |
| 2022/0129687 A1 | 4/2022 | Munir | |
| 2022/0253676 A1* | 8/2022 | Valstar | G06N 3/045 |
| 2023/0290505 A1 | 9/2023 | Valstar | |
| 2024/0054794 A1 | 2/2024 | Valstar | |

FOREIGN PATENT DOCUMENTS

| | | |
|---|---|---|
| EP | 3621276 | 3/2020 |
| WO | 2019103484 | 5/2019 |

OTHER PUBLICATIONS

McEnte P Minotto et al: "Audiovisual Voice Activity Detection Based on Microphone Arrays and Color Information", IEEE Journal of Selected Topics in Signal Processing, IEEE, US, vol. 7, No. 1, Feb. 1, 2013, pp. 147-156.
Bao, Fang, Michael Neumann, and Ngoc Thang Vu. "CycleGAN-Based Emotion Style Transfer as Data Augmentation for Speech Emotion Recognition." Interspeech. 2019. 5 pages.
Dasari et al., Evaluation of biases in remote photoplethysmography methods, npj Digital Medicine (2021) 4:91, 13 pages.
Hao-Yu Wu et al., Eulerian Video Magnification for Revealing Subtle Changes in the World, ACM Transactions on Graphicsvol. 31, Issue 4, Jul. 2012 Article No. 65, pp. 1-8.
IPRP for PCT/GB2021/051904 (Jan. 24, 2023) 10 pages.
Karras, Tero, Samuli Laine, and Timo Aila. "A style-based generator architecture for generative adversarial networks." Proceedings of the IEEE/CVF conference on computer vision and pattern recognition. Mar. 29, 2019. 12 pages.
Kumar, Abhinav, et al. "Luvli face alignment: Estimating landmarks' location, uncertainty, and visibility likelihood." Proceedings of the IEEE/CVF Conference on Computer Vision and Pattern Recognition. 2020. 18 pages.
Li et al., Learning Motion-Robust Remote Photoplethysmography through Arbitrary Resolution Videos, arXiv:2211.16922v3, Dec. 2, 2022, 11 pages.

Newland, Real-time remote photoplethysmography using a webcam and graphical user interface (https://www.immynewland.com/wp/research/remote-ppg-gui/, accesed Apr. 18, 2023) 15 pages.
International Search Report and Written Opinion from PCT Application PCT/GB2020/051521 dated Sep. 25, 20202, 12 pgs.
Blaz Meden et al: "k-Same-Net: k-Anonymity with Generative Deep Neural Networks for Face Deidentification", ENTROPY, vol. 20, No. 1, Jan. 13, 2018 (Jan. 13, 2018), p. 60, XP055730554. Doi: 10.3390/20010060 Sections 3.2, 3.3, 3.4, 4.1 and 4.6; Algorithm 1; figure 3.
Yuezun Li et al: "De-identification without losing faces", arxiv.org, Cornell University Library, 201 Olin Library Cornell University Ithaca, NY 14853, Feb. 12, 2019 (Feb. 12, 2019), XP081027993, Sections 1-3; figures 1, 4.
Seyed Ali Osia et al: "A Hybrid Deep Learning Architecture for Privacy-Preserving Mobile Analytics", arxiv.org, Cornell University Library, 201 Olin Library Cornell University Ithaca, NY 14853. Mar. 8, 2017 (Mar. 8, 2017), XP081565752. figure 1 accessed Dec. 27, 2019, 13 pgs.
Search Report from GB Application GB1909003.4 dated Nov. 26, 2019, 4 pgs.
IET Signal processing, vol. 11, No. 9, 2017, B Meden et al., "Face deidentification with generative deep neural networks", pp. 1046-1054.
Ren et al, "Proceedings of the European Conference on Computer Vision (ECCV)", published 2018, ECCV, pp. 620-636, Ren et al, "Learning to anonymize faces for privacy preserving action detection".
Pan et al, Mar. 27, 2019, "k-Same-Siamese-GAN", arxiv.org [online], Available from: https://arxiv.org/abs/1904.00816v1 [Accessed Nov. 21, 2019].
W Bailer, "International Conference on Multimedia Modeling", published Jan. 2019, Springer, pp. 169-177, W Bailer, "Face Swapping for Solving Collateral Privacy Issues in Multimedia Analytics".
Guo et al, "2018 37th Chinese Control Conference (CCC)", published Jul. 2018, IEEE, pp. 9356-9361, Guo et al., "Integrating Diversity into Neural-Net Face Deidentification".
IEEE transactions on Knowledge and Data Engineering, vol. 17, No. 2, 2005, Newton et al., "Preserving privacy by de-identifying face images", pp. 232-243.
Seyed Ali Osia et al: "A Hybrid Deep Learning Architecture for Privacy-Preserving Mobile Analytics", arxiv.org, Cornell University Library, 201 Olin Library Cornell University Ithaca, NY 14853, Mar. 8, 2017 (Mar. 8, 2017), XP081565752, figure 1 accessed May 8, 2019, 12 pgs.
Martinez, et al., "Automatic Analysis of Facial Actions: A Survey", IEEE Transactions on Affective Computing, vol. 8, No. X, 2017, 23 pgs.
Sanchez et al., "Triple consistency loss for pairing distributions in GAN-based face synthesis", Computer Vision Laboratory, The University of Nottingham, Paper, accessed Nov. 8, 2018, 10 pgs.
Chhabra, et al., "Anonymizing k-Facial Attributes via Adversarial Perturbations", Proceedings of the Twenty-Seventh International Joint Conference on Artificial Intelligence (IJCAI-18), Jul. 2018, 7 pgs.
James A Russell, A Circumplex Model of Affect, Journal of Personality and Social Psychology vol. 39, No. 6, 1161-1178 (1980).
Marta Garnelo et al., Neural Processes, arXiv:1807.01622v1 [cs.LG] Jul. 4, 2018.
Search Report for GB2011453.4, Feb. 3, 2021 (2 Pages).
Alnuhait et al., FaceChat: An Emotion-Aware Face-to-face Dialogue Framework, Arxiv.org, Mar. 8, 2023, XP091460100 (8 pages).
EPO Office action for Application No. 21751805.5, dated Jun. 25, 2024 (7 pages).
ISR and WO for PCT/GB2024/050996, Jun. 24, 2024 (20 oages).
Warriner, Amy Beth et al., Norms of valence, arousal, and dominance for 13,915 English lemmas, Behavior Research Methods, vol. 145, No. 4, Dec. 1, 2013 (17 pages).
Francesco, CHATCARE: an emotional-aware conversational agent for assisted therapy, 2022.

(56) References Cited

OTHER PUBLICATIONS

Zhong et al., An Affect-Rich Neural Conversational Model with Biased Attention and Weighted Cross-Entropy Loss,, AAAI Technical Track: Natural Language Processing, vol. 33 No. 01: AAAI-19, IAAI-19, EAAI-20.

Zhong et al., CARE: CARE: Commonsense-Aware Emotional Response Generation with Latent Concepts, The Thirty-Fifth AAAI Conference on Artificial Intelligence (2021).

Meden, et al. "Face Deidentification with Generative Deep Neural Networks", IET Signal Processing, May 2017, 18 pgs.

\* cited by examiner

GENERATIVE NEURAL NETWORK FOR SYNTHESIS OF FACES AND BEHAVIORS

FIELD OF THE INVENTION

The invention relates to data security. More particularly, the invention relates to the anonymization of a person in a video or an image while preserving behaviour information and to the use of machine learning to identify behaviour.

BACKGROUND

A video or an image of a person may comprise audio-visual behaviour data of that person. Such behaviour data may comprise data relating to the person's body pose, gestures, facial expressions, head actions, gaze behaviour, tone of voice, speech rate, timbre, or a combination thereof.

A trained medical professional, such as a psychologist or a psychiatrist, or an automated machine-learned system, may be able to determine or estimate an emotional or internal cognitive state (e.g. the affective dimension 'valence') of the person from the person's expressive visual behaviour or from a video (with or without audio) or image comprising the behaviour data. It may also be possible to infer static characteristics or aspects of the person, such as age, gender, body pose, etc., from the visual appearance of the person from the video or image and/or age, gender, etc., from audio.

To automate the process of predicting the emotional or internal cognitive state, or static aspects, of the person, statistical machine learning methods may be employed. Large amounts of expressive audio-visual behaviour data may be required for statistical machine learning methods to learn to predict a cognitive state of the person based on the observed behaviour. That means that large amounts of personal data may be stored.

The identity of the person expressing the audio-visual behaviour will usually be revealed in the video or image of the person—this is something that is not always desirable.

While there are some promising approaches for anonymization in the prior art, it remains challenging to anonymise identity in a way that preserves other aspects of a video so that it remains interpretable by a person.

SUMMARY

According to a first aspect of the present disclosure, there is provided a computing system comprising a generative neural network that is configured to: receive a plurality of input videos, wherein each input video comprises a face (and optionally also a voice) defining an identity and wherein each input video comprises a behaviour, each input video comprising similar behaviour to each of the other input videos and a different identity to each of the other input videos; and synthesize an output video from the input videos, wherein the output video comprises a synthetic face (and optionally also a voice) defining a synthetic identity, wherein the generative neural network has been trained with a loss function to preserve the behaviour of the input videos while generating the synthetic identity so that the synthetic identity is different from each identity of the input videos.

The behaviour may comprise a facial and/or voice behaviour. The behaviour may comprise facial action coding data. The facial action coding data may comprise: muscle actions, head pose, gaze direction, and/or jaw thrust, blow and bite (e.g. as discussed in Automatic Analysis of Facial Actions: A Survey, by Martinez et al). The behaviour may comprise a cognitive or emotional state, such as a depression score. The voice data may comprise tone of voice, mel-frequency cepstral coefficients, and speech rate.

The input video may comprise audio data. The output video may comprise audio data.

The input videos may be generated by a decoding neural network.

The synthetic face of the output video may be different from each of the faces of the input videos. The synthetic face may have the appearance of a real face. The synthetic identity may not be a real identity. The synthetic identity of the output video may be different from each of the identities of the input videos. The identities of the input videos may be different from the synthetic identity of the output. The audio data in the output video may have a different identity than the audio data in any of the input videos.

At least one term in the loss function may be determined using a loss function neural network.

The loss function used to train the generative neural network may comprise a similarity term penalising outputs that look like the face of any of the input videos (and optionally penalising outputs that sound like the voice of the input videos). The similarity term may be determined using a face recognising neural network (and optionally a voice recognition neural network).

The loss function used to train the generative neural network may comprise a behaviour term, penalising outputs that do not preserve behaviour. The behaviour term may be determined using a behaviour estimating neural network (which may operate on both visual and audio data).

The loss function used to train the generative neural network may comprise a face term, penalising outputs that do not look like a face (and optionally, a voice term penalising outputs that do not sound like a natural voice). The face term may be determined using a face detecting neural network.

The loss function used to train the generative neural network may comprise a consistency term, penalising outputs that do not preserve the synthetic face and/or the synthetic identity between successive frames in the output video. The consistency term may be determined using face and voice recognising neural networks.

The loss function used to train the generative neural network may comprise a function of the form:

$$L = L_1 + \frac{\lambda}{1 + \Sigma_{k=1}^{K}(L_2^k)} + \kappa L_3 + \gamma L_4$$

wherein: $L_1$ is a similarity term penalising outputs that look like the face of any of the input videos; $L_2$ is a behaviour term penalising outputs that do not preserve behaviour; $L_3$ is a face term penalising outputs that do not look like a face; $L_4$ is a consistency term penalising outputs that do not preserve the synthetic face and/or the synthetic identity between successive frames of the output video; $\lambda$, $\kappa$, and $\gamma$ are weights; and K is a total number of identities.

The generative neural network may be a Generational Adversarial Network (GAN).

The GAN may comprise a generative network configured to generate a candidate, and may comprise a discriminative network configured to evaluate the candidate. The candidate may comprise a synthetic video. Evaluating the candidate may comprise scoring the candidate based on the loss function.

The synthetic video may look at least superficially authentic to a human observer.

The computing system may further comprise: a decoding neural network upstream of the generative neural network, the decoding neural network configured to receive feature data and a plurality of stored face videos, wherein each stored face video comprises a different face (and optionally a voice) defining a different identity, wherein the decoding neural network has been trained to combine feature data with the plurality of stored face and voice videos to generate the input videos, wherein each input video comprises the face (and optionally a voice) defining the identity and wherein each input video comprises the behaviour.

The decoding neural network may have been trained to up-sample the feature data, which may result in a resolution that is the same as an original dimensionality or original resolution of a recorded video. The decoding neural network may be configured to up-sample the feature data, which may result in a resolution that is the same as an original resolution of the recorded video.

The feature data may comprise data from which behaviour can be inferred.

The different faces (and optionally voices) of the plurality of stored faces (and optionally voices) videos may comprise faces (and optionally voices) that are all different from each other. The computing system may comprise a memory configured to store data comprising the plurality of stored face (and optionally voice) videos.

The computing system may further comprise: an encoding neural network upstream of the decoding neural network, the encoding neural network configured to receive a recorded video comprising an original face defining an original identity and wherein each recorded video comprises an original behaviour, wherein the encoding neural network is configured to extract the feature data from the recorded videos thereby anonymising the original identity while preserving the original behaviour in the feature data.

The encoding neural network may down-sample the feature data, thereby achieving a dimensionality or resolution that is lower than an original dimensionality or original resolution of the recorded videos. The encoding neural network may comprise the first n layers of a neural network that has been trained to identify, classify or score behaviour (such as an emotional or cognitive state).

The recorded videos may have been recorded prior to use in the computing system. Alternatively, the computing system may comprise a device configured to record the recorded videos.

The encoding neural network and the decoding neural network may define an hourglass neural network architecture comprising a bottleneck region between the encoding and decoding networks.

The computing system may further comprise: an encryption module configured to encrypt the feature data; and a decryption module configured to decrypt the encrypted feature data; wherein the encryption module and the decryption module are downstream of the encoding neural network and upstream of the decoding neural network.

The encoding neural network may comprise a plurality of layer-blocks, wherein each layer-block comprises a convolutional layer-block and a pooling layer.

The decoding neural network and/or the encoding neural network may comprise at least one CRP layer-block, wherein each CRP layer-block comprises a convolutional layer-block, non-linear activation layer (such as a rectified linear unit layer, ReLU) and a pooling layer.

The decoding neural network and/or the encoding neural network may comprise at least one RCRP layer-block, wherein each RCRP layer block comprises two Conv-activation layer pairs followed by a pooling layer.

The encoding neural network may comprise: a first RCRP layer-block; a second RCRP layer-block; a third RCRP layer-block; and a fourth RCRP layer-block. The decoding neural network may comprise: a first RCRP layer-block; a second RCRP layer-block; a third RCRP layer-block; and a fourth RCRP layer-block. The computing system may comprise skip-layer connections connecting outputs of the third and fourth layer-blocks of the encoding neural network with inputs of the first and second layer-blocks of the decoding neural network. In other embodiments, the number of blocks in the encoding and/or decoding neural network may larger or smaller.

The first two layer-blocks of the encoding neural network may not be connected to the last two layer-blocks of the decoding neural network. The condition of not being connected may comprise an indirect connection between the first two layer-blocks of the encoding neural network and the last two layer-blocks via another layer-block of the encoding neural network or another layer-block of the decoding neural network.

The encoding neural network may be configured to down-sample the recorded videos to decrease dimensionality. The decoding neural network may have been trained to up-sample the feature data to increase dimensionality (e.g. to restore the dimensionality of the recorded videos).

The computing system may further comprise a statistical machine learner configured to characterize the behaviour of the output videos.

Characterizing the behaviour may comprise classifying or identifying a cognitive state. The cognitive state may comprise, for example, a depression score (or an indication/score of happiness, contentment, tiredness, anxiety, etc).

The statistical machine learner may comprise a behaviour identifying neural network configured to receive the output videos, wherein the behaviour identifying neural network has been trained to characterize the behaviour of the output videos.

The computing system may comprise a user interface configured to allow a technician to annotate the output videos to indicate the behaviour, thereby generating annotated output videos. The statistical machine learner may be configured to receive the annotated output videos to improve the characterization of the behaviour.

The cognitive state may comprise a depression state. The depression state may comprise a depression score.

The depression score may comprise at least one of: a Global Assessment of Functioning (GAF) score, a Beck Depression Inventory (BDI) score, a Beck Hopelessness Scale score, a Centre for Epidemiological Studies—Depression Scale (CES-D) score, a Center for Epidemiological Studies Depression Scale for Children (CES-DC) score, a Edinburgh Postnatal Depression Scale (EPDS) score, a Geriatric Depression Scale (GDS) score, a Hamilton Rating Scale for Depression (HAM-D) score, a Hospital Anxiety and Depression Scale score, a Kutcher Adolescent Depression Scale (KADS) score, a Major Depression Inventory (MDI) acore, a Montgomery-Asberg Depression Rating Scale (MADRS) score, a PHQ-9 score, a Mood and Feelings Questionnaire (MFQ) score, a Weinberg Screen Affective Scale (WSAS) score, a Zung Self-Rating Depression Scale equivalent score, and a combination thereof.

The cognitive state may comprise a mental health state. The mental health state may comprise a mental health classification.

The mental health classification may comprise at least one of: an International Classification of Disease (ICD) classification, a Diagnostic and Statistical manual of mental disorders (DSM) classification, a Chinese Classification of Mental Disorders (CCMD) classification, a Latin America Guide for Psychiatric Diagnosis (GLDP) classification, a Research Domain Criteria (RDoC) classification, a Diagnostic Classification of Mental Health and Developmental Disorders of Infancy and Early Childhood (DC) classification, a Research Diagnostic criteria-Preschool Age (RDC-PA) classification, a French Classification of Child and Adolescent Mental Disorders (CFTMEA) classification, and a combination thereof.

The computing system may comprise a client-side processor comprising the encoding neural network of the computing system. The computing system may comprise a server-side processor comprising the decoding neural network of the computing system. The client-side processor may be configured to communicate with the server-side network.

A user device may comprise the client-side processor. The user device may comprise a smartphone. The user device may comprise a device configured to record videos. The user device may be configured to communicate with the server-side processor.

The server-side processor may be implemented in a cloud computing system.

According to a second aspect of the present disclosure, there is provided a computer-implemented method for synthesizing videos using the computing system according to the first aspect of the present disclosure.

According to a third aspect of the present disclosure, there is provided a computer-implemented method for synthesizing videos using a computing system, the method comprising: receiving, at a neural network, a plurality of input videos, wherein each input video comprises a face (and optionally a voice) defining an identity and wherein each input video comprises a behaviour, each input video comprising the same behaviour as each of the other input videos, and a different identity to each of the other input videos; and synthesizing, using the neural network, an output video from the input videos, wherein the output video comprises a synthetic face (and optionally a voice) defining a synthetic identity, wherein the neural network has been trained, with a loss function, to preserve the behaviour of the input videos while generating the synthetic identity that is different from each identity of the input videos.

Any feature disclosed in relation to the first aspect may also apply to the second or third aspect.

According to a fourth aspect, there is provided a method, comprising:
receiving, by a decoding neural network, feature data and a plurality of stored face videos (optionally also comprising a voice), wherein each stored face video comprises a different face (and a different voice, where the face video comprises a voice) defining a different identity, wherein the decoding neural network is upstream of the generative neural network, wherein the decoding neural network is configured to receive the feature data and the plurality of stored face videos, and wherein each stored face video comprises a different face (and optionally a different voice) defining a different identity; and generating, by the decoding neural network, the input videos, wherein the decoding neural network has been trained to combine the feature data with the plurality of stored face videos to generate the input videos, wherein each input video comprises the face defining the identity and wherein each input video comprises the behaviour.

The method according to the fourth aspect may comprise the features of the third aspect. The following features relate to either the fourth or third aspect.

The method may comprise up-sampling the feature data using the decoding neural network. The decoding neural network may have been trained to up-sample the feature data, thereby achieving a dimensionality or resolution that is the same as an original dimensionality or original resolution of a recorded video. The decoding neural network may be configured to up-sample the feature data, thereby achieving a dimensionality or resolution that is the same as an original dimensionality or original resolution of a recorded video.

The feature data may comprise data from which behaviour can be inferred.

The different faces (and optionally voices) of the plurality of stored faces videos may comprise faces (and optionally voices) that are all different from each other.

The method may comprise receiving the plurality of stored face videos from a store comprising the plurality of stored face videos. The store may comprise a memory configured to store data comprising the plurality of stored face videos. The store may be configured to save new stored face videos. The store comprising the plurality of stored face videos may be fixed or may configured to be updated from time to time.

The method may comprise:
receiving, by an encoding neural network, recorded videos, wherein the encoding neural network is upstream of the decoding neural network, wherein the encoding neural network is configured to receive a recorded video comprising an original face (and optionally an original voice) defining an original identity, and wherein each recorded video comprises an original behaviour; and
extracting, by the encoding neural network, the feature data from the recorded videos, anonymising the original identity while preserving the original behaviour in the feature data.

The method may comprise down-sampling the feature data, thereby achieving a dimensionality or resolution that is lower than an original dimensionality or original resolution of the recorded videos. The encoding neural network and the decoding neural network may define an hourglass neural network architecture. The hourglass neural network architecture may comprising a bottleneck region between the encoding and decoding networks.

The method may comprise:
encrypting the feature data; and
decrypting the encrypted feature data.
The method may comprise:
characterizing the behaviour of the output videos using a statistical machine learner.

Characterizing the behaviour may comprise predicting the presence of specific behaviours. The specific behaviours may comprise, for example, smiling with teeth visible, smiling without teeth visible, yawning, frowning, gazing, or presenting a neutral expression, etc.

Characterizing the behaviour may comprise predicting a cognitive state indicated by the behaviour. The cognitive state may comprise, for example, a depressed, a happy state, a content state, a tired state, or a worried state, etc.

The method may comprise:
receiving, by a behaviour identifying neural network of the statistical machine learner, the output videos.

The statistical machine learner may comprise the behaviour identifying neural network configured to receive the output videos, wherein the behaviour identifying neural network has been trained to characterize the behaviour of the output videos.

The method may comprise manually annotating the output videos to indicate the behaviour. The method may comprise providing the annotated output videos to the statistical machine learner.

BRIEF DESCRIPTION OF THE DRAWINGS

Embodiments will now be described, purely by way of example, with reference to the accompanying drawings, in which.

DETAILED DESCRIPTION

Figure 1:
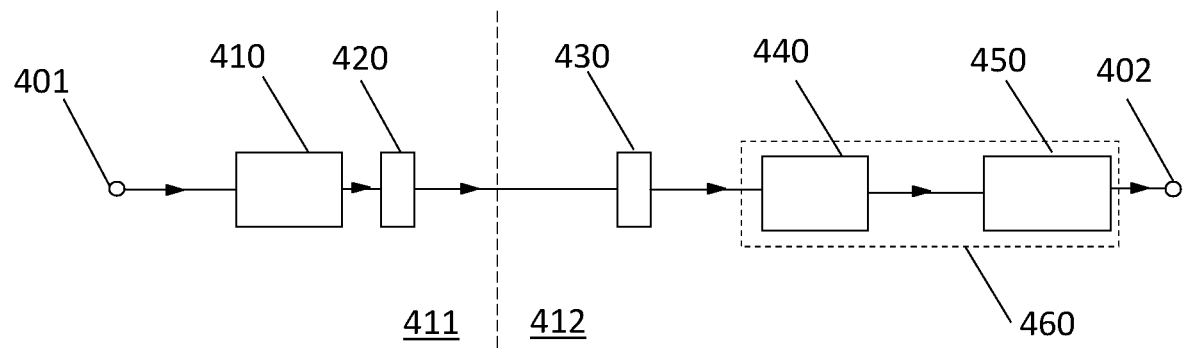
FIG. 1 illustrates an embodiment of a computing system for classifying or scoring behaviour of a subject in a video.

FIG. 1 illustrates an example computing system for classifying or scoring behaviour of a subject in a video. The computing system comprises a client-side processor 411 and a server-side processor 412, coupled together by a network (indicated by the dotted line). A neural network is split between the client-side processor 411 and the server-side processor 412, and comprises a first portion 410 (on the client-side processor), and a second portion 460 (on the server-side processor). In order to provide encrypted network transport, some embodiments comprise an encryption module 420 and decryption module 430 on either side of the network transport (but this is not essential).

The neural network 410, 460 is configured to receive videos 401 (i.e. video data, which may be pre-recorded) and is trained to characterise the behaviour of subjects in the video, for example to provide as an output 402 an identification of a cognitive state and/or a score of depression. The video data may comprise both visual data and audio data. The first portion 410 of the neural network comprises layers (e.g. n layers) that reduce the dimensionality of the video data. Following training of the neural network 410, 460, these layers will tend to extract features that are necessary to identify the behaviour, and will tend not to retain information that is superfluous to this task. Since behaviour is independent of the identity of the subject, the subject will not be identifiable from the feature data (because identity is superfluous for characterising behaviour).

The neural network 410 may comprise a Convolutional Neural Network (CNN). The neural network may comprise a series of Convolutional/Rectified-Linear unit (ReLu)/Pooling (CRP) layer-blocks. The CRP layer-blocks may be followed by a fully-connected (FC) layer. The neural network may comprise three or more CRP layer-blocks.

The first portion 410 may comprise layers of the neural network from an input block up to and including a penultimate CRP layer-block. The second portion 460, on the server-side processor 412, may comprise a final CRP layer-block 440 and a fully-connected (FC) layer 450. In some embodiments, the neural network may comprise more than one fully-connected layer.

Splitting the neural network enables video data, in which the subject is identifiable, to be locally processed to extract feature data, in which the subject cannot be identified. In addition to enhancing security by providing anonymity, the feature data is smaller in size, and therefore requires lower bandwidth to transmit over a network to the server-side processor.

While the exact architecture of the neural network may vary, an example architecture comprises: a first portion 410 comprising four CRP blocks, and second portion 460 comprising one CRP block, followed by an FC layer. All of the convolutional layers may use kernels of size 3×3, applied at stride 1, using image padding to make the output map to the same dimensions as the convolutional layer input. All pooling layers may be max-pool layers with kernel size 2×2, applied with stride 2. For each CRP block, the output resolution may be reduced by a factor 4 after the max-pool layer. The number of output channels (and thus kernels in each CRP block) may be increased by a factor 2 after each CRP block. The total number of weights after each CRP block may be halved. The weights in the neural network may use a precision of unit 8 and therefore only 1/16th of the original image size (measured in bits) may be sent over the network.

The client side portion 410 may be incorporated into an application and may, for instance, be run on a personal computing device such as a smart phone, tablet or laptop. The application may be configured to facilitate a guided interview in which the subject records themselves, using their personal computing device, answering a series of questions. The questions may be provided by the application, for example as text prompts, or via a synthetic avatar (or by an interviewer in communication via the personal computing device). The resulting video may be processed on the personal computing device to anonymize the subject, then sent for further processing on a server (e.g. in a cloud based computing infrastructure).

Once the neural network has been split up into portions 410, 440 which are placed on the client-side and server-side processors 411, 412 for deployment, it may be more difficult to update the first portion 410 of the neural network (e.g. changing architecture, hyperparameters or filter weights). It may, however, be straightforward to update the trained model 460 of the neural network, on the server-side processor 411, for example to improve depression scoring, or to identify some other behaviour.

In some embodiments, as an alternative to using a split neural network, a neural network that has been trained to extract features (such as facial action coding data, language and inflection from audio data) may be used in place of the first portion 410, with a neural network trained to identify a behaviour from the output of the first neural network (e.g. facial action coding data, language and inflection from audio data) used in place of the second portion 440, 450.

Figure 2:
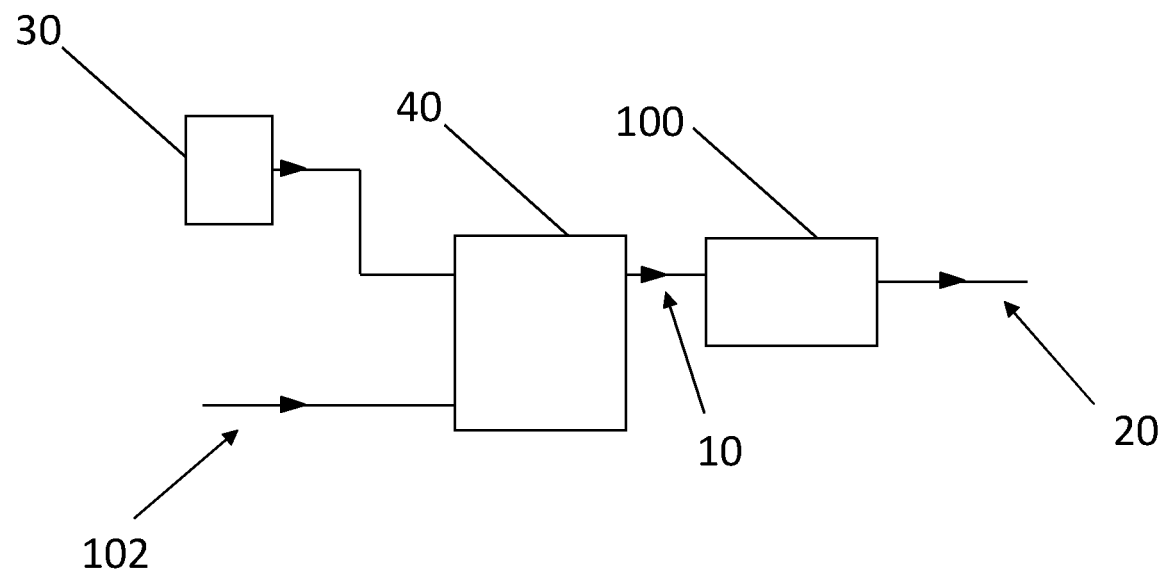
FIG. 2 illustrates an embodiment of a computing system for generating anonymized videos using feature data and stored videos.

FIG. 2 illustrates an example computing system for generating anonymized videos comprising a decoding neural network 40, a generative neural network 100 and a store 30 of face and voice video data.

The decoding neural network 40 is configured to receive feature data 102 (for example, the output from the first portion of the neural network 410 from the example of FIG. 1) and a plurality of stored face and voice videos from store 30. The decoding neural network 40 is configured to generate the input videos 10 from the feature data 102 and the stored face videos (which may comprise audio data of a voice).

Each of the input videos 10 comprises an identity from the stored input videos that has been mapped by the decoding neural network 40, based on the feature data 102, to include the same behaviour as the video from which the feature data 102 was obtained. In embodiments where the facial expression is indicative of the behaviour that is characterised by the second portion 460, facial expression will be preserved from the original video 401 to each of the input videos 10. More broadly, any behaviour that is an important or significant factor in characterising the behaviour that the neural network 410, 460 is trained to recognise will be preserved (e.g. including speech and inflection in audio).

The generative neural network 100 is configured to receive the plurality of input videos 10 and to generate a synthetic output video 20 that mixes identities from the input videos 10 and which includes the behaviour described by the feature data 102. The synthetic output video 20 has a consistent identity that can be understood and interpreted by a human observer, but the identity is neither that of the subject from which the feature data 102 was extracted, nor that of any of the video data from the store 30. This enables a human to be involved in interpreting behaviour without compromising security or anonymity.

In order to train the generative neural network 100 a loss function may be used that preserves the behaviour of the input videos 10 while generating a synthetic identity that is different from each identity of the input videos 10.

For example, the loss function may be of the form:

$$L = L_1 + \frac{\lambda}{1 + \Sigma_{k=1}^{K}(L_2^k)} + \kappa L_3 + \gamma L_4$$

in which: $L_1$ is a similarity term penalising outputs that look like the face of any of the input videos; $L_2$ is a behaviour term penalising outputs that do not preserve behaviour; $L_3$ is a face term penalising outputs that do not look like a face; $L_4$ is a consistency term penalising outputs that do not preserve the synthetic face and/or the synthetic identity between successive frames of the output video; $\lambda$, $\kappa$, and $\gamma$ are weights; and K is a total number of identities.

The similarity term may be determined using a face recognising neural network (and optionally a voice recognising neural network). The behaviour term may be determined using a behaviour estimating neural network. The face term may be determined using a face detecting neural network. The consistency term may be determined using a face recognising neural network (and optionally a voice recognising neural network).

In the embodiment illustrated, the generative neural network 100 is a Generational Adversarial Network (GAN) that comprises a generative network configured to generate a candidate set of filter weightings, and a discriminative network configured to evaluate the candidate filter weightings. Evaluating the candidate may comprise scoring the candidate based on the loss function.

It will be appreciated that the store 30 may be updated or modified from time to time with additional stored face videos and/or different stored face videos.

Figure 3:
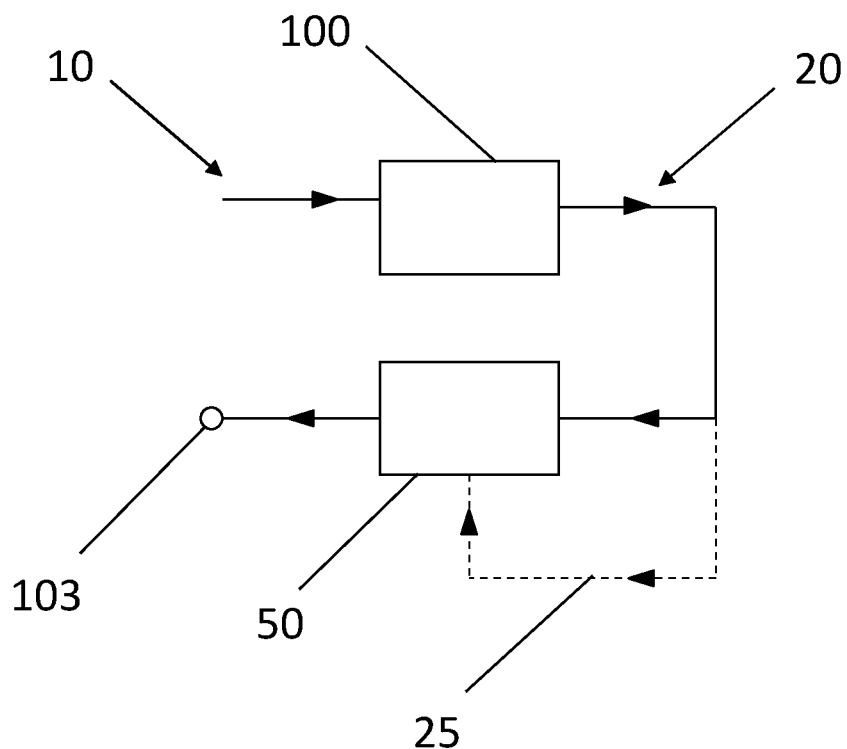
FIG. 3 illustrates an embodiment of a computing system for characterising behaviour from anonymised videos, for example produced from an embodiment like that of FIG. 2.

FIG. 3 illustrates another example embodiment of a computing system. The computer system comprises a statistical machine learner 50 configured to characterize the behaviour in the output video 20, which is produced by a generative neural network 100, as described with reference to FIG. 2. The output video 20 may be annotated by a human observer to provide an annotated output video 25. The annotated output video 25 may be provided to the statistical machine learner 50 to improve the characterization of the behaviour in the output video 20. The statistical machine learner 50 is configured to indicate a characterized behaviour 103.

Characterizing the behaviour may comprise identifying or scoring a cognitive state. The cognitive state may comprise, for example, depression, happiness, contentment, tiredness, worry, etc.

The statistical machine learner may comprise a behaviour identifying neural network configured to receive the output videos, wherein the behaviour identifying neural network has been trained to characterize the behaviour of the output videos.

The computing system may comprise a user interface configured to allow a technician to annotate the output videos to indicate the behaviour thereby generating annotated output videos. The statistical machine learner may be configured to receive the annotated output videos to improve the characterization of the behaviour.

The user interface may be configured to receive a user input. The user input may comprise at least one of: a behaviour selection, a behaviour indication, a shaded region, a highlighted region, an answer to a question, a characterization of behaviour, a categorization of behaviour, a numerical value, a descriptive word, an annotation, a rating, a score, and a combination thereof.

Annotating the output video may comprise at least one of: indicating a behaviour, indicating a temporal and/or spatial portion of the output video, answering a question, providing a numerical score associated with a behaviour, providing a descriptive word associated with the behaviour.

The generative neural network 100 may be configured and/or trained as described in relation to FIG. 2.

Figure 4:
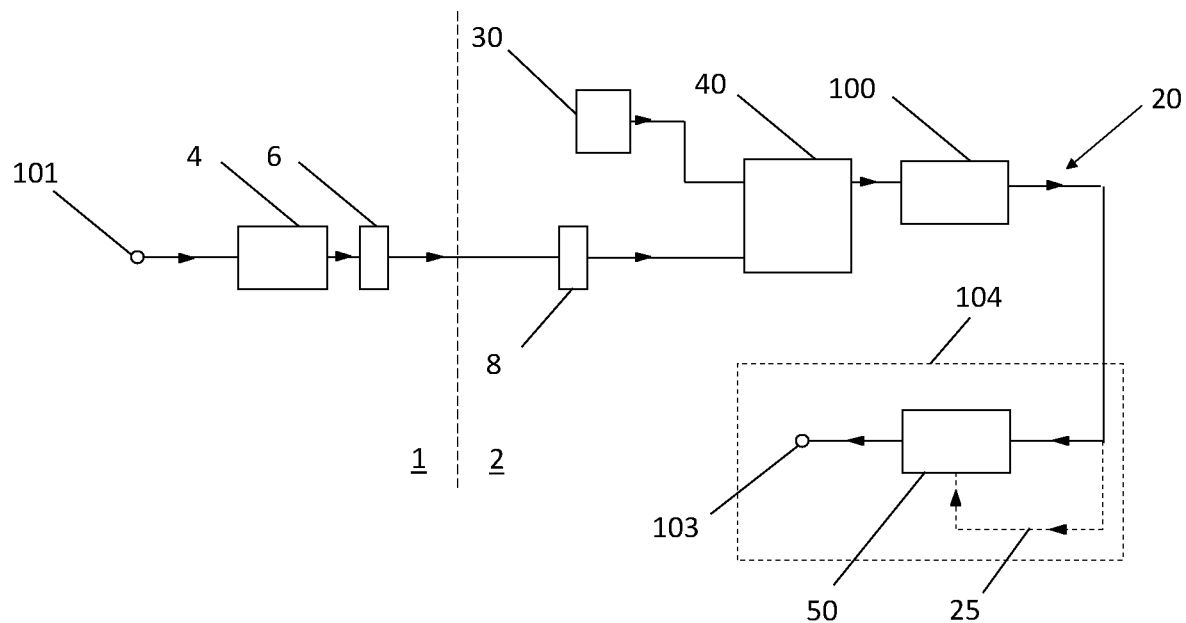
FIG. 4 illustrates another example embodiment of a computing system for receiving a video of a subject, extracting features for network transport, generating an anonymized synthetic video with a synthetic subject using the features and stored video data, and characterising the behaviour of the subject from the synthetic video.

FIG. 4 illustrates another example embodiment of a computing system, combining features. The computing system comprises an encoding neural network 4, an encryption module 6, a decryption module 8, a store 30 comprising a plurality of stored face videos (optionally comprising audio data of a voice), a decoding neural network 40, a generative neural network 100, and a statistical machine learner 50.

The encoding neural network 4 is configured to receive recorded videos 101. The encoding neural network 4 is configured to extract feature data from the recorded videos 101 (e.g. as described with reference to FIG. 1). The encryption module 6 is configured to encrypt the feature data that is extracted by the encoding neural network 4. The encoding neural network 4 and the encryption module 6 may be comprised in a client-side processor 1.

A server-side processor 2 is configured to receive the encrypted feature data. The decryption module 8 is configured to receive the encrypted feature data from the encryption module 6. The decryption module 8 is configured to decrypt the encrypted feature data. The decoding neural network 40 is configured to receive the decrypted feature data from the decryption module 8. The decoding neural network 40 is also configured to receive the plurality of stored face videos from the store 3. The decoding neural network 40 is configured to generate input videos 10.

The generative neural network 100 is configured to receive the input videos 10. The generative neural network 100 is configured to generate the output video 20.

The output video 20, annotated output video 25, and the characterized behaviour 103 may be the only data of the computing system that are seen by humans 104. Other data received and generated by the computing system may be encoded, encrypted, or generally 'hidden' at an architecture level of the computing system.

The encoding neural network 4 and decoding neural network 40 pair may be trained in a similar manner to the neural network shown in FIG. 1 with the following alterations: instead of using a CNN+FC architecture, an hourglass network may be used with fewer skip-layer connections than there are downs-sampling stages, so that the highest-resolution response map may lack skip-layer connections. The computing system may be divided into its constituent parts at the bottleneck of the hourglass network.

Storage of (personal) data may be in the form of the encrypted output from the encryption module 6 on client-side processor 1. The encrypted output may be decrypted by the decryption module 8 on the server-side processor 2. Synthesis of output videos may proceed as follows. The encoding neural network 4 receives a recorded video 101, such as a single target behaviour video F_1. The encoding neural network extracts feature data from the recorded video 101. The encryption module 6 encrypts the extracted feature data; the encrypted feature data is then decrypted by the decryption module 8. The decoding neural network 40 then receives the feature data 102 that has been decrypted as well as K original face videos F_k (where k=1 . . . K) from the store 30. The decoding neural network 40 then decodes the feature data and maps the original face videos on the decoded feature data. The K reconstructed face videos 10 are then used as the input to a Generational Adversarial Network (GAN) 100 which will generate a synthesised video F_s 20 displaying the same behaviour as shown in F_1 but with a facial appearance and voice quality that does not look like any of the faces F_1 or F_k or sound like any of the associated voices.

The loss function L used to train the generative neural network 100 may have the same form as that disclosed in relation to FIG. 2.

$L_1$ may be a loss term that measures how well the new synthesised video represents the same behaviour as the recorded videos (wherein the input videos are associated with the recorded videos). This may be, for example, measured in terms of concordance correlation coefficient (CCC) and may be done in an unsupervised manner by calculating the CCC between the predictions made by a pre-trained behaviour estimation network N_b applied to F_k and F_s: for example, $L_1$=CCC(N_b(F_k), N_b(F_s)).

$L_2$ may be the loss term that determines how much the synthesised face F_s looks like F_k. This may be, for example, done using a pixel-based loss, a loss in an encoder space, or by using a face recognition network N_{id} using F_k as the gallery image and F_s as the probe image. Note that, in the function, the inverse of the sum of the id losses is taken as it may be desirable to want the face recognition term to be as low as possible and thus the individual face recognition losses as high as possible.

$L_3$ may be a loss term that penalises synthesised faces that do not look like faces. This score may be obtained by using a pre-trained network for face-detection N_{face}, for example, e.g. performed N_{face}(F_s).

$L_4$ may be a loss term penalising faces that look dissimilar to each other from one frame to another. This may ensure that the synthesised face appears to be the same synthetic person throughout the video. To do so, one may use e.g. the same face recognition network N_{id} using the first synthesised frame of F_s as the gallery image and all subsequent frames as the probe images. Here, low losses may be preferred, rather than high losses.

The encoding neural network 4 is upstream of the decoding neural network 40. The encoding neural network 4 is configured to receive recorded videos 101. Each recorded video comprises an original face and optionally a voice defining an original identity. Each recorded wherein each input video comprises an original behaviour. The encoding neural network 4 has been trained to extract the feature data 102 from the recorded videos 101 thereby anonymising the original identity while preserving the original behaviour in the feature data 102.

The encoding neural network 4 may be configured to down-sample the recorded videos 101, thereby achieving a dimensionality of the feature data 102 that is lower than an original dimensionality of the recorded videos 101.

In some embodiments, the output video 20 may not be annotated by a human. The annotated output video 25 may not be provided or generated, or may be omitted or discarded.

In some embodiments, the statistical machine learner 50 is omitted. The computing system may be configured to generate a final output that is the output video 20 wherein the output video may be classified by a human observer only (rather than a statistical machine learner 50).

Figure 5:
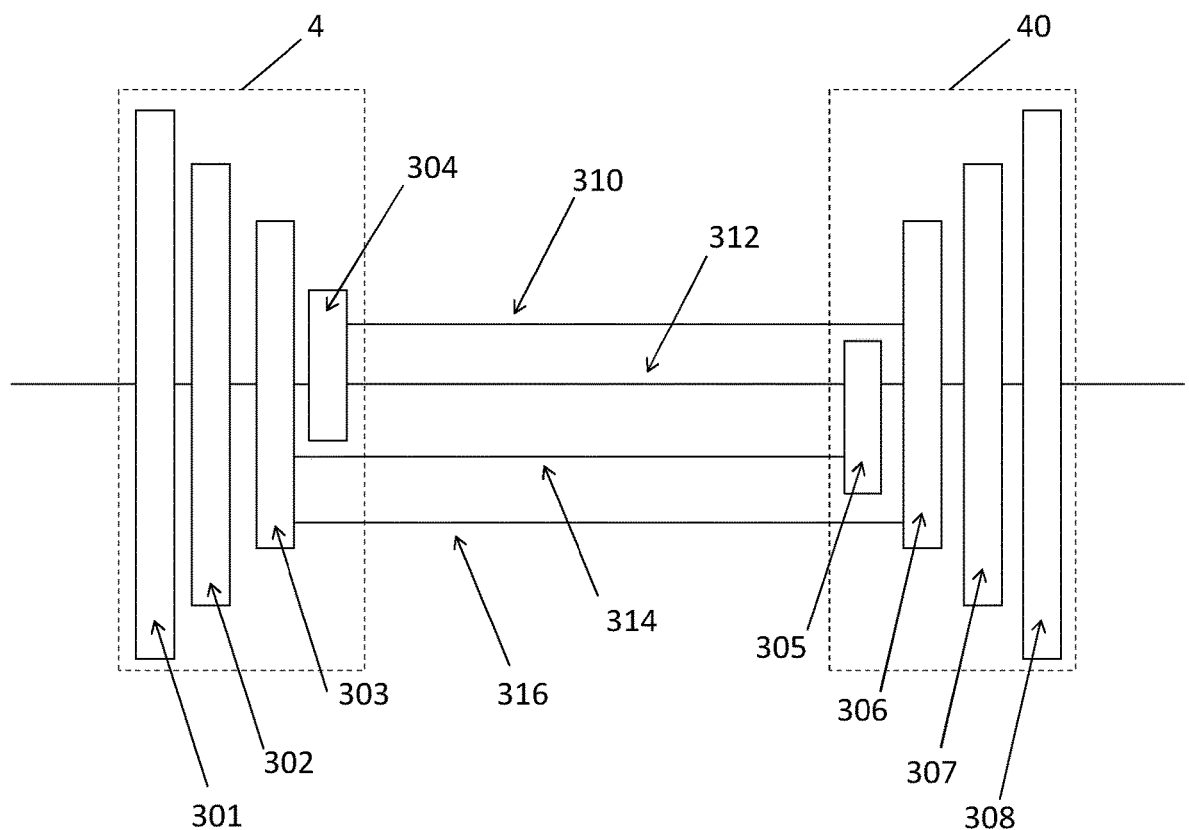
FIG. 5 illustrates example embodiment of a neural network which may be applicable to some embodiments.

FIG. 5 illustrates an example embodiment of a neural network comprising an encoding neural network 4 and a decoding neural network 40.

The encoding neural network 4 comprises a first layer-block 301, a second layer-block 302, a third layer-block 303, and a fourth layer-block 304. The first layer-block 301 is coupled to the second layer-block 302. The second layer-block 302 is coupled to the third layer-block 303. The third layer-block 303 is coupled to the fourth layer-block 304.

The decoding neural network 40 comprises a first layer-block 305, a second layer-block 306, a third layer-block 307, and a fourth layer-block 308. The first layer-block 305 is coupled to the second layer-block 306. The second layer-block 306 is coupled to the third layer-block 307. The third layer-block 307 is coupled to the fourth layer-block 308.

The fourth layer-block 304 of the encoding neural network 4 is coupled to the first layer-block 305 of the decoding neural network 40 via connection 312.

The neural network comprises skip-layer connections 310, 314, and 316. Skip-layer connection 310 couples the fourth layer-block 304 of the encoding neural network 4 to the second layer-block 306 of the decoding neural network 40. Skip-layer connection 314 couples the third layer-block 303 of the encoding neural network 4 to the first layer-block 305 of the decoding neural network 40. Skip-layer connection 316 couples the third layer-block 303 of the encoding neural network 4 to the second layer-block 306 of the decoding neural network 40.

Connections 310, 312, 314, and 316 may comprise encrypted connections between the encoding neural network 4 and the decoding neural network 40.

The encoding neural network 4 and the decoding neural network 40 may define an hourglass neural network architecture 4, 40. The hourglass neural network architecture 4,

40 may comprise a bottleneck region. The bottleneck region may be defined as region wherein a layer of the encoding neural network 4 is connected to a layer of the decoding neural network 40. The condition of being 'connected' may comprise at least one of: a wireless connection, a wireless encrypted connection, a wired connection, a wired encrypted connection, and a combination thereof.

The computing system may further comprise: an encryption module configured to encrypt the feature data 102 and a decryption module configured to decrypt the encrypted feature data.

The encoding neural network 4 comprises a plurality of layer-blocks 301-304, wherein each layer-block 301-304 comprises a convolutional layer-block and a pooling layer. The decoding neural network 40 may comprise a plurality of layer-blocks 305-308, wherein each layer-block 305-308 comprises a convolutional layer-block and a pooling layer. Each convolutional layer-block may comprise a layer pair, the layer pair comprising: a convolutional layer; and a rectified-linear-unit layer. The convolutional layer-block may comprise a residual module. The residual module may comprise the layer pair. The convolutional layer-block may comprise a plurality of residual modules. The encoding neural network 4 may comprise: a first layer-block 301; a second layer-block 302; a third layer-block 303; and a fourth layer-block 304. The decoding neural network 40 may comprise: a first layer-block 305; a second layer-block 306; a third layer-block 307; and a fourth layer-block 308. The computing system may comprise skip-layer connections 310-312 connecting outputs of the third and fourth layer-blocks 303, 304 of the encoding neural network 4 with inputs of the first and second layer-blocks 305, 306 of the decoding neural network 40. The first two layer-blocks 301, 302 of the encoding neural network 4 may not be connected to the last two layer-blocks 307, 308 of the decoding neural network 40. The condition of not being connected may comprise an indirect connection between the first two layer-blocks 301, 302 of the encoding neural network 4 and the last two layer-blocks 307, 308 via another layer-block 303, 304 of the encoding neural network 4 or another layer-block 305, 306 of the decoding neural network 40.

While the exact architecture of the neural network may vary, one typical architecture of the neural network may comprise: an encoding neural network comprising four down-sampling RCRP blocks (each comprising two Conv-ReLu layer lairs, followed by a pooling layer); and a decoding neural network comprising four RCRP blocks, wherein the convolutions learn to up-sample data back towards the original resolution. Skip-layer connections may be used to connect the third and fourth RCRP blocks of the encoding neural network with the output of the first and second RCRP blocks of the decoding neural network. The first two RCRP blocks of the encoding neural network and the last two RCRP blocks of the decoding neural network may not be connected. This may reduce the network transfer overhead. All convolutional layers may use kernels of size 3×3, applied at stride 1, using image padding to make the output maps the same dimensions as the convolutional layer input. All pooling layers may be max-pool layers with kernel size 2×2, applied with stride 2. After each RCRP block, the output resolution may reduced by a factor 4 by the max-pool layer. The number of output channels (and thus kernels learned in that RCRP block) may be increased by a factor 2 after each RCRP block. The total number of weights after each RCRP block may be halved. The weights in the neural network may use a precision of unit 8. The neural network may define an hourglass network architecture comprising a bottleneck region. At the bottleneck region of the hourglass network architecture, a response map may be only 1/16th of the original image size (measured in bits), but in addition two skip-layer connections may send response maps of sizes 1/8 and 1/4 of the original, and thus the total transmission size over the network may be reduced to 43.75% of the original data.

It will be appreciated that, in other embodiments, the encoding neural network 4 and/or decoding neural network 40 may have different architectures comprising different numbers of layer-blocks and/or different configurations/numbers of skip-layer connections.

REFERENCES

[1] Ren, Zhongzheng, Yong Jae Lee, and Michael S. Ryoo. "Learning to anonymize faces for privacy preserving action detection." Proceedings of the European Conference on Computer Vision (ECCV). 2018.
[2] Chhabra, Saheb, et al. "Anonymizing k-facial attributes via adversarial perturbations." arXiv preprint arXiv: 1805.09380 (2018).
[3] Sanchez, Enrique, and Michel Valstar. "Triple consistency loss for pairing distributions in GAN-based face synthesis." arXiv preprint arXiv:1811.03492 (2018).
[4] Osia, Seyed Ali, et al. "A hybrid deep learning architecture for privacy-preserving mobile analytics." arXiv preprint arXiv:1703.02952 (2017).
[5] Meden, Blaž, et al. "Face deidentification with generative deep neural networks." IET Signal Processing 11.9 (2017): 1046-1054.

The invention claimed is:

1. A computing system comprising a generative neural network that is configured to: receive a plurality of input videos, wherein each input video comprises a face defining an identity and a behavior, wherein the behavior is the same in each input video and the identity is different in each input video;
   synthesize an output video from the input videos, wherein the output video comprises a synthetic face defining a synthetic identity, wherein the generative neural network has been trained, with a loss function, to preserve the behavior of the input videos while generating the synthetic identity so that the synthetic identity is different from each identity of the input videos;
   wherein a term in the loss function is determined using a loss function neural network;
   wherein:
   i) a similarity term in the loss function is determined using a face recognizing neural network and optionally using a voice recognizing neural network;
   ii) a behavior term in the loss function is determined using a behavior estimating neural network;
   iii) a face term in the loss function is determined using a face detecting neural network and optionally a voice detecting neural network;
   iv) a consistency term in the loss function is determined using a face recognizing neural network and optionally a voice recognizing neural network.

2. The computing system of claim 1, wherein the loss function used to train the generative neural network comprises a similarity term penalizing outputs that look like the face of any of the input videos and optionally audio that sounds like the voice of any of the input videos.

3. The computing system of claim 1, wherein the loss function used to train the generative neural network comprises a behavior term penalizing outputs that do not preserve behavior.

4. The computing system of claim 1, wherein the loss function used to train the generative neural network comprises a face term penalizing outputs that do not look like a face and optionally a voice term penalizing outputs that do not sound like a natural voice.

5. The computing system of claim 1, wherein the loss function used to train the generative neural network comprises a consistency term penalizing outputs that do not preserve the synthetic face and/or the synthetic identity between successive frames in the output video.

6. The computing system of claim 1, further comprising:
a decoding neural network upstream of the generative neural network, the decoding neural network configured to receive feature data and a plurality of stored face videos, wherein each stored face video comprises a different face defining a different identity, wherein the decoding neural network has been trained to combine feature data with the plurality of stored face videos to generate the input videos, wherein each input video comprises the face defining the identity and wherein each input video comprises the behavior.

7. The computing system of claim 6, further comprising: an encoding neural network upstream of the decoding neural network, the encoding neural network configured to receive recorded videos, wherein each recorded video comprises an original face defining an original identity and wherein each input video comprises an original behavior, wherein the encoding neural network has been trained to extract the feature data from the recorded videos thereby anonymizing the original identity while preserving the original behavior in the feature data.

8. The computing system of claim 7, wherein the encoding neural network comprises: a first encoder configured to encode a face of the person in the video at a first resolution; a second encoder configured to encode a body of the person in the video at a second resolution; and a third encoder configured to encode a full scene of the video at a third resolution.

9. The computing system of claim 7, wherein the computing system further comprises:
an encryption portion configured to encrypt the feature data; and a decryption portion configured to decrypt the encrypted feature data;
wherein the encryption portion and the decryption portion are downstream of the encoding neural network and upstream of the decoding neural network.

10. The computing system of claim 7, wherein the encoding neural network comprises:
a first layer-block; a second layer-block; a third layer-block; and a fourth layer-block;
wherein the decoding neural network comprises: a first layer-block; a second layer-block; a third layer-block; and a fourth layer-block; and
wherein the computing system comprises skip-layer connections connecting outputs of the third and fourth layer-blocks of the encoding neural network with inputs of the first and second layer-blocks of the decoding neural network.

11. The computing system of claim 7, wherein the first two layer-blocks of the encoding neural network are not connected to the last two layer-blocks of the decoding neural network.

12. The computing system claim 7, wherein the encoding neural network has been trained to down-sample the recorded videos to decrease dimensionality; and the decoding neural network has been trained to up-sample the feature data to increase dimensionality, to ensure dimensionality of the input videos is approximately equal to the dimensionality of the recorded videos.

13. The computing system of claim 1, wherein the behavior comprises an expressive visual behavior and/or a cognitive state.

14. The computing system of claim 13, wherein the cognitive state comprises a depression score.

15. The computing system of claim 1, wherein the computing system comprises: a client-side processor comprising an encoding neural network of the computing system; and a server-side processor comprising a decoding neural network of the computing system.

16. A computer-implemented method for synthesizing videos using a computing system, the method comprising;
receiving, at a neural network, a plurality of input videos, wherein each input video comprises a face defining an identity and a behavior, wherein the behavior is the same in each input video and the identity is different in each input video; and
synthesizing, using the neural network, an output video from the input videos, wherein the output video comprises a synthetic face defining a synthetic identity, wherein the neural network has been trained, with a loss function, to preserve the behavior of the input videos while generating the synthetic identity that is different from each identity of the input videos;
wherein the loss function used to train the neural network comprises at least one of:
  i) a similarity term penalizing outputs that look like the face of any of the input videos and optionally penalizing outputs that sound like the voice of any of the input videos;
  ii) a behavior term penalizing outputs that do not preserve behavior;
  iii) a face term penalizing outputs that do not look like a face and optionally a voice term penalizing outputs that do not sound like a natural voice;
  iv) a consistency term penalizing outputs that do not preserve the synthetic face and/or the synthetic identity between successive frames in a frame of the output video; and
  v) a function of the form:

$$L = L_1 + \frac{\lambda}{1 + \Sigma_{k=1}^{K}(L_2^k)} + \kappa L_3 + \gamma L_4$$

wherein: $L_1$ is a similarity term penalizing outputs that look like the face of any of the input videos; $L_2$ is a behavior term penalizing outputs that do not preserve behavior; $L_3$ is a face term penalizing outputs that do not look like a face; $L_4$ is a consistency term penalizing outputs that do not preserve the synthetic face and/or the synthetic identity between successive frames of the output video; $\lambda$, $\kappa$, and $\gamma$ are weights; and K is a total number of identities.

17. A computing system comprising a generative neural network that is configured to:
receive a plurality of input videos, wherein each input video comprises a face defining an identity and a behavior, wherein the behavior is the same in each input video and the identity is different in each input video; and synthesize an output video from the input videos, wherein the output video comprises a synthetic face defining a synthetic identity, wherein the generative neural network has been trained, with a loss function, to preserve the behavior of the input videos while generating the synthetic identity so that the synthetic identity is different from each identity of the input videos;

wherein the loss function used to train the generative neural network comprises a function of the form:

$$L = L_1 + \frac{\lambda}{1 + \Sigma_{k=1}^{K}(L_2^k)} + \kappa L_3 + \gamma L_4$$

wherein: $L_1$ is a similarity term penalizing outputs that look like the face of any of the input videos; $L_2$ is a behavior term penalizing outputs that do not preserve behavior; $L_3$ is a face term penalizing outputs that do not look like a face; $L_4$ is a consistency term penalizing outputs that do not preserve the synthetic face and/or the synthetic identity between successive frames of the output video; $\lambda$, $\kappa$, and $\gamma$ are weights; and K is a total number of identities.

18. A computing system comprising a generative neural network that is configured to:

receive a plurality of input videos, wherein each input video comprises a face defining an identity and a behavior, wherein the behavior is the same in each input video and the identity is different in each input video; and synthesize an output video from the input videos, wherein the output video comprises a synthetic face defining a synthetic identity, wherein the generative neural network has been trained, with a loss function, to preserve the behavior of the input videos while generating the synthetic identity so that the synthetic identity is different from each identity of the input videos;

a decoding neural network upstream of the generative neural network, the decoding neural network configured to receive feature data and a plurality of stored face videos, wherein each stored face video comprises a different face defining a different identity, wherein the decoding neural network has been trained to combine feature data with the plurality of stored face videos to generate the input videos, wherein each input video comprises the face defining the identity and wherein each input video comprises the behavior.

19. The computing system of claim 18, further comprising: an encoding neural network upstream of the decoding neural network, the encoding neural network configured to receive recorded videos, wherein each recorded video comprises an original face defining an original identity and wherein each input video comprises an original behavior, wherein the encoding neural network has been trained to extract the feature data from the recorded videos thereby anonymizing the original identity while preserving the original behavior in the feature data.

20. The computing system of claim 19, wherein the encoding neural network comprises: a first encoder configured to encode a face of the person in the video at a first resolution; a second encoder configured to encode a body of the person in the video at a second resolution; and a third encoder configured to encode a full scene of the video at a third resolution.

21. The computing system of claim 19, wherein the computing system further comprises:

an encryption portion configured to encrypt the feature data; and a decryption portion configured to decrypt the encrypted feature data;

wherein the encryption portion and the decryption portion are downstream of the encoding neural network and upstream of the decoding neural network.

22. The computing system of claim 19, wherein the encoding neural network comprises:

a first layer-block; a second layer-block; a third layer-block; and a fourth layer-block;

wherein the decoding neural network comprises: a first layer-block; a second layer-block; a third layer-block; and a fourth layer-block; and wherein the computing system comprises skip-layer connections connecting outputs of the third and fourth layer-blocks of the encoding neural network with inputs of the first and second layer-blocks of the decoding neural network.

23. The computing system of claim 19, wherein the first two layer-blocks of the encoding neural network are not connected to the last two layer-blocks of the decoding neural network.

24. The computing system claim 19, wherein the encoding neural network has been trained to down-sample the recorded videos to decrease dimensionality; and the decoding neural network has been trained to up-sample the feature data to increase dimensionality, to ensure dimensionality of the input videos is approximately equal to the dimensionality of the recorded videos.

25. The computing system of claim 18, wherein the behavior comprises an expressive visual behavior and/or a cognitive state.

26. The computing system of claim 25, wherein the cognitive state comprises a depression score.

27. The computing system of claim 18, wherein the computing system comprises: a client-side processor comprising an encoding neural network of the computing system; and a server-side processor comprising a decoding neural network of the computing system.

* * * * *